(No Model.)

W. O. WHITMAN.
COMBINED AUTOMATIC RELIEF AND VACUUM AIR VALVE FOR RADIATORS.

No. 478,489. Patented July 5, 1892.

WITNESSES:

INVENTOR:
Willard O. Whitman,
PER C. A. Shawkles
ATTYS

UNITED STATES PATENT OFFICE.

WILLARD O. WHITMAN, OF BOSTON, MASSACHUSETTS.

COMBINED AUTOMATIC RELIEF AND VACUUM AIR-VALVE FOR RADIATORS.

SPECIFICATION forming part of Letters Patent No. 478,489, dated July 5, 1892.

Application filed February 29, 1892. Serial No. 423,198. (No model.)

*To all whom it may concern:*

Be it known that I, WILLARD O. WHITMAN, of Boston, in the county of Suffolk, State of Massachusetts, have invented certain new and useful Improvements in a Combined Automatic Relief and Vacuum Air-Valve for Radiators, of which the following is a description sufficiently full, clear, and exact to enable any person skilled in the art or science to which said invention appertains to make and use the same, reference being had to the accompanying drawings, forming part of this specificaion, in which—

Figure 2:
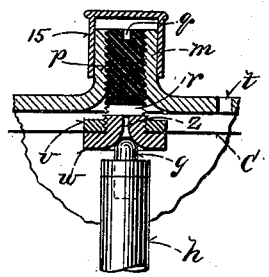
Figure 1:
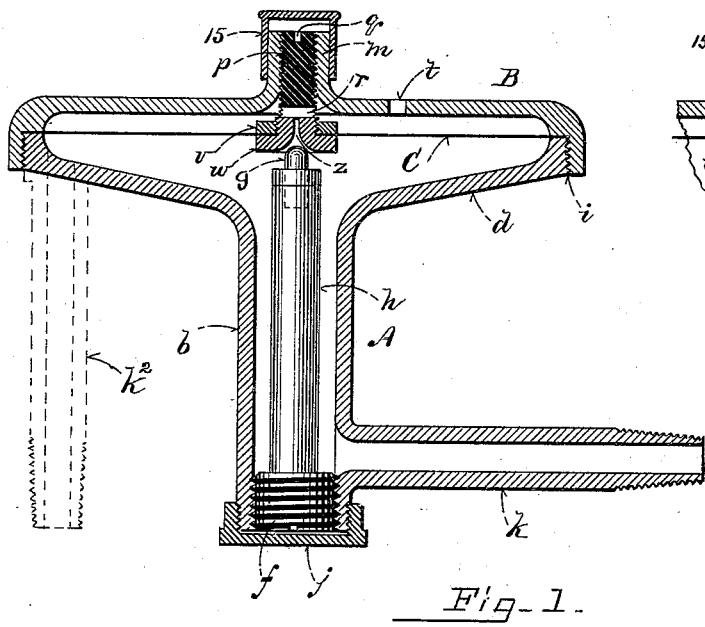
Figure 3:
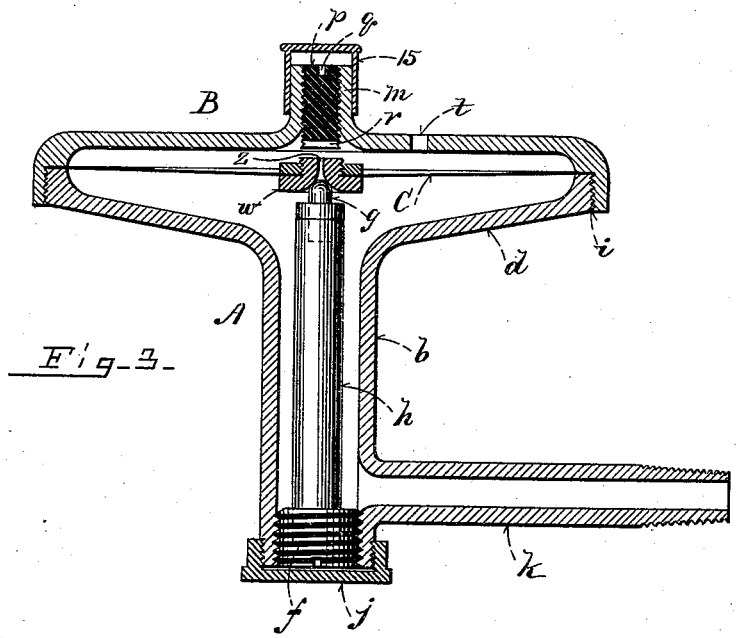

Figure 1 is a vertical transverse section of my improved valve; Fig. 2, a sectional view showing the valve as closed by the expansion-plug when steam is on in the radiator, and Fig. 3 a vertical transverse section showing the valve closed by atmospheric pressure when steam-pressure is reduced or shut off in the radiators.

Like letters and figures of reference indicate corresponding parts in the different figures of the drawings.

Automatic relief-valves for radiators as ordinarily constructed are normally open when there is no steam in the radiators and are closed by an expansion-plug heated by the steam. When cold the radiators are thus full of air, and a considerable time is required for the steam to force the air therefrom and attain an efficient degree of heat.

My invention relates especially to a construction of valve whereby when the steam is shut off and the radiator cools a vacuum is formed therein, into which the steam will pass quickly when again turned on and rapidly heat the radiator to the required temperature. The valve is, moreover, constructed to open automatically as soon as the steam-pressure shall become greater than the atmospheric to permit the escape of air that may remain and close again by the heat-expansible plug to prevent the escape of steam.

In carrying out my improvement I make use of mechanism which will be understood from the following explanation:

In the drawings, A B represent the members of the valve-casing. The member A has a tubular shank $b$, one end of which flares, forming a circular head $d$. The opposite end is interiorly screw-threaded to receive the threaded base $f$ of a heat-expansible standard or plug $h$, which projects longitudinally through the shank $b$. This standard is constructed of hard rubber or other similar material which is readily expanded by heat. A valve $g$ is formed on the upper end of the standard. A screw-cap $j$ closes the lower end of the shank $b$ below the standard-base $f$, and a nipple $k$ taps the shank above said base, whereby the mechanism is attached to and supported on the radiator; or, if preferred, the nipple may enter the head $d$, as represented by dotted lines $k^2$ in Fig. 1. The member B is disk-shaped and is tapped and screw-threaded at $i$ to turn onto the head $d$ of the member A. Said member B is provided centrally with a nipple $m$, which is interiorly screw-threaded to receive a screw-plug $p$, provided with a tool kerf $q$ in its upper end and having a lateral slot $r$ in its lower end, which forms an air-port, hereinafter described. The nipple $m$ is covered by a cap 15. A vent-opening $t$ is formed in the member B, one or more of said openings being employed, if desired. A diaphragm consisting of thin sheet-copper or other flexible metal rests upon the edge of the head $d$ and is clamped tightly in position by turning on the member B. The diaphragm C is provided centrally with a valve-seat $w$. This valve-seat may be secured in the diaphragm in any suitable manner, that shown being by a lock-nut $v$, turned thereon. A port $z$ opens centrally through the seat and registers with the port $r$ in the plug $p$, the upper end of the valve-seat $w$ normally engaging the lower end of said plug. The lower mouth of said port is formed to receive the valve $g$, which seats thereon, as hereinafter described.

In the use of my improvement, the parts being in the position shown in Fig. 1, the diaphragm-valve seat $w$ is in engagement with the plug $p$. Steam being admitted to the radiator passes into the valve-casing through its nipple, and the air in said casing is expelled through the ports $z$ $r$ and escapes through the vent $t$. The expansible standard $h$ becoming at once heated by the steam, its valve $g$ immediately seats, closing the port $z$ of the diaphragm-valve and preventing the escape of steam, the parts now assuming the position shown in Fig. 2, which represents their normal arrangement while the steam-pressure is on in the radiator. As soon as steam is turned off from the radiator and the pressure thereof against the diaphragm C is released, a vacuum is formed in the radiator. The air-pressure through the vents $t$ depresses said diaphragm, holding the seat $w$ closed against the valve $g$, the standard $h$ having contracted while cooling. The parts are now in the position shown in Fig. 3. The seat $w$ being out of contact with the plug $p$ and the valve tightly closed, preventing the admission of air into the radiator, the vacuum is maintained. When steam is again turned on, the parts remain in this position until the steam-pressure on the lower face of the diaphragm overcomes the outside air-pressure, when the seat $w$ will leave the valve $g$ and contact with the plug $p$, opening the ports $z$ $r$ momentarily for the escape of air, as before, said ports remaining open until the standard $h$ has expanded sufficiently to again close it.

Having thus explained my invention, what I claim is—

1. In a relief-valve mechanism for radiators, the combination, with a casing, of a heat-actuated valve disposed therein and a flexible diaphragm within the casing, carrying a valve-seat in position to be engaged by said valve, the outer side of said diaphragm being exposed to the atmosphere, substantially as described.

2. A combination relief-valve and vacuum-maintaining valve for radiators, comprising a casing opening into the radiator, a flexible diaphragm in said casing, provided centrally with a valve-seat, an air-vent in the casing at one side of said diaphragm, and a valve of heat-expansible material disposed at the opposite side of said diaphragm in position to engage said seat, substantially as described.

3. In a device of the character described, a casing, a flexible diaphragm in said casing, a valve-seat in said diaphragm, having a port opening therethrough, a valve of heat-expansible material at one side of said diaphragm and adapted to engage said seat, an air-vent in the casing at the opposite side of said diaphragm, and an adjustable stop for said seat, substantially as described.

4. A valve mechanism for radiators, comprising a casing, a nipple for connecting said casing to the radiator, a flexible diaphragm extending across said casing, a valve-seat in said diaphragm, a valve of heat-expansible material on the steam side of said diaphragm in position to close said seat, a stop on the opposite side of said diaphragm in position to engage said seat and having an air-port registering with the seat-port, and a vent in said casing, substantially as described.

5. The combination, with the casing having an air-vent and radiator connection, of the flexible diaphragm secured across said casing and provided with a valve-seat, as $w$, opening therethrough, a heat-actuated valve for engaging said seat, and an adjustable stop for engaging said seat and limiting its movement away from said valve.

6. The combination of the casing comprising members A B with the diaphragm C, secured between said members, the valve-seat $w$ in said diaphragm having a port $z$, the heat-actuated valve $g$ for engaging said seat, the adjustable stop $p$, having a port $r$, registering with the seat-port, and a vent in said member B, substantially as described.

WILLARD O. WHITMAN.

Witnesses:
O. M. SHAW,
K. DURFEE.